Patented July 13, 1954

2,683,745

UNITED STATES PATENT OFFICE 2,683,745

PREPARATION OF 2-AMINO-α-METHYL-BENZYL ALCOHOL

William S. Emerson and Robert A. Heimsch, Dayton, Ohio, assignors to Monsanto Chemical Company, St. Louis, Mo., a corporation of Delaware No Drawing. Application August 23, 1952, Serial No. 306,072

5 Claims. (Cl. 260—575)

The present invention relates to the preparation of carbinols, and more particularly provides a new and improved process for the preparation of 2-amino-α-methylbenzyl alcohol from 2-nitroacetophenone.

2-amino-α-methylbenzyl alcohol is of particular interest in that it can be easily dehydrated to 2-aminostyrene and is also of possible utility in the preparation of pharmaceuticals; however, the prior art provides no industrially feasible method for its preparation. Now we have found that this carbinol can be readily obtained by hydrogenation of 2-nitroacetophenone, an intermediate which is readily available by nitration of ethylbenzene and subsequent oxidation of the resulting 2-nitroethylbenzene.

While under certain conditions chemical reduction or catalytic hydrogenation of the other isometric nitroacetophenones has been reported to give the carbinols, similar procedures with 2-nitroacetophenone result either only in reduction of the nitro radical, or in the ultimate reduction of also the acetyl substituent to the ethyl radical. Thus, according to Leonard and Boyd, J. Org. Chem., 11, 405–18 (1946), 3-aminoacetophenone was hydrogenated in the presence of Raney nickel to give a 75 per cent yield of 3-amino-α-methylbenzyl alcohol; but with 2-nitroacetophenone, absorption of hydrogen was slow, so that hydrogenation in the presence of the same catalyst resulted in incomplete reduction of the nitro radical. We have found that while the results obtained with this catalyst depend somewhat upon temperature, a good yield of 2-nitroacetophenone being obtained at moderately increased temperatures and a considerable quantity of 2-ethylaniline at higher temperatures, no carbinol is formed.

Reported reductions of 2-nitroacetophenone, whether effected chemically or by catalytic hydrogenation do not disclose formation of any carbinol. Leonard and Boyd loc. cit. report the production of good yields of 2-aminoacetophenone either with tin and hydrochloric acid or by hydrogenation in presence of platinum oxide. In platinum oxide-catalyzed hydrogenation, Nord (Ber., 52, 1705 (1919)) obtained methyl-3-anthril or 2-aminoacetophenone, depending upon the quantity of hydrogen used; and he noted that hydrogen absorption ceased after about three moles had been absorbed. Employing colloidal palladium, Skita and Meyer (Ber., 45, 3579 (1912)) obtained 2-aminoacetophenone in practically a quantitative yield.

Now we have found that 2-nitroacetophenone is converted to 2-amino-α-methylbenzyl alcohol when hydrogenation is effected in the presence of a palladium catalyst at increased temperatures, say, at temperatures of from 40° C. to 150° C. and at a pressure of at least 10 atmospheres, say, at a pressure of from 10 to 1000 atmospheres. As catalyst we prefer to use palladium deposited on charcoal, but any palladium-containing catalyst may be used, e. g., colloidal palladium, palladium black, palladium chloride deposited on charcoal or other substantially neutral catalyst support, such as pumice, asbestos, etc. In order to effect smooth reaction it is desirable to conduct the hydrogenation in the presence of an inert diluent, which diluent may be, e. g., ethanol, dioxane, cyclohexane, benzene, etc. Anhydrous conditions are advantageously employed.

Hydrogenation of 2-nitroacetophenone according to the present process proceeds with formation of, say, from 10 per cent to 50 per cent of 2-amino-α-methylbenzyl alcohol and varying quantities of 2-aminoacetophenone, as well as of some tar-like material, depending upon the temperature and pressure conditions. Optimum operating conditions are those resulting in minimum conversion to tar, since the 2-aminoacetophenone may be recycled to the process; hence we prefer to operate at moderately increased temperatures, i. e., at temperatures of from 80° C. to 130° C. and at pressures, say, from 100 to 500 atmospheres. Under these conditions, conversions to the carbinol are from, say, 20 to 30 per cent, and tar formation is reduced. At lower temperatures, say, at a temperature of from 40° C. to 60° C. under the same pressure conditions, conversion to carbinol is only about half of that obtained at around 100° C., but it may be increased by working at higher pressures.

The invention is further illustrated, but not limited, by the following examples:

*Example 1*

A mixture consisting of 25 g. of 2-nitroacetophenone, 125 cc. of absolute ethanol, and 2.5 g. of a catalyst comprising palladium (5%) on charcoal was brought to a temperature of 50° C. in a small rocking autoclave, and hydrogen was introduced into the mixture at this temperature for 18 hours, employing a hydrogen pressure of from 800–900 p. s. i. The reaction mixture was then allowed to cool, the catalyst was removed by filtration and the filtrate was distilled to yield 2.5 g. (12.1% conversion) of the substantially pure 2-amino-α-methylbenzyl alcohol, B. P.

110° C.–115° C./0.9 mm., M. P. 56–56.5° C.; and analyzing as follows:

|  | Found | Calculated for $C_8H_{11}ON$ |
|---|---|---|
| Percent C | 70.07 | 70.08 |
| Percent H | 8.03 | 8.00 |
| Percent N | 10.22 | 10.25 |

*Example 2*

To a small rocking autoclave there was charged 25 g. of 2-nitroacetophenone, 125 cc. of absolute ethanol and 2.5 g. of a catalyst comprising palladium (5%) on activated charcoal. The temperature of the mixture was brought to 125° C. and hydrogen was introduced into it at this temperature for 4 hours, a hydrogen pressure of from 1500 to 1800 p. s. i. being employed. Fractionation of the resulting reaction mixture gave 5.5 g. (26.9% conversion) of the substantially pure 2-amino-α-methylbenzyl alcohol, B. P. 100° C–105° C./0.6 mm.

What we claim is:

1. The process which comprises contacting 2-nitro-acetophenone with hydrogen in the presence of a palladium catalyst, at a temperature of from 40° C. to 150° C. and at a pressure of from 10 to 1000 atmospheres, and recovering 2-amino-α-methylbenzyl alcohol from the resulting reaction product.

2. The process which comprises contacting 2-nitroacetophenone with hydrogen in the presence of a catalyst comprising palladium deposited on charcoal at a temperature of from 40° C. to 150° C. and at a pressure of from 10 to 1000 atmospheres and recovering 2-amino-α-methylbenzyl alcohol from the resulting reaction product.

3. The process which comprises contacting 2-nitroacetophenone in the presence of an inert diluent and a catalyst comprising palladium deposited on charcoal, at a temperature of from 40° C. to 150° C. and at a pressure of from 10 to 1000 atmospheres and recovering 2-amino-α-methylbenzyl alcohol from the resulting reaction product.

4. The process which comprises contacting 2-nitro-acetophenone with hydrogen, under anhydrous conditions, in the presence of an inert diluent and a catalyst comprising palladium deposited on charcoal, at a temperature of from 40° C. to 150° C. and at a pressure of from 10 to 1000 atmospheres and recovering 2-amino-α-methylbenzyl alcohol from the resulting reaction product.

5. The process which comprises contacting 2-nitroacetophenone in absolute ethanol, in the presence of a catalyst comprising palladium deposited on charcoal, at a temperature of from 40° C. to 150° C. and at a pressure of from 10 to 1000 atmospheres and recovering 2-amino-α-methylbenzyl alcohol from the resulting reaction product.

No references cited.